US00RE40612E

(19) United States
(12) Reissued Patent
Paliotta et al.

(10) Patent Number: US RE40,612 E
(45) Date of Reissued Patent: Dec. 30, 2008

(54) MULTI-LAYERED CHILD RESISTANT BLISTER PACKAGE AND METHOD OF ASSEMBLING SAME

(75) Inventors: Michael Paliotta, Horseheads, NY (US); George Howell, Elmira, NY (US)

(73) Assignee: Howell Packaging division of FM Howell & Co., Elmira, NY (US)

(21) Appl. No.: 11/296,848

(22) Filed: Dec. 8, 2005

Related U.S. Patent Documents

Reissue of:
(64) Patent No.: 6,659,280
Issued: Dec. 9, 2003
Appl. No.: 10/061,154
Filed: Feb. 4, 2002

(51) Int. Cl.
*B65D 83/04* (2006.01)

(52) U.S. Cl. ..... 206/531; 206/462; 206/469
(58) Field of Classification Search ..... 206/461, 206/462, 467, 468, 469, 531, 532, 534, 538, 206/539
See application file for complete search history.

(56) References Cited

U.S. PATENT DOCUMENTS 3,811,564 A 5/1974 Braber
4,125,190 A 11/1978 Davie, Jr. et al.
5,050,739 A 9/1991 Hannan et al.
5,265,728 A 11/1993 Allendorf et al.
5,339,960 A 8/1994 Price
5,758,774 A 6/1998 Leblong
5,871,145 A 2/1999 Hermann et al.
5,915,559 A 6/1999 Hulick et al.
5,954,202 A 9/1999 Mellon
6,047,829 A 4/2000 Johnstone et al.
6,161,699 A 12/2000 Gartland
6,273,260 B1 8/2001 ColDepletro et al.
6,394,275 B1 5/2002 Paliotta et al.
2003/0006163 A1 1/2003 Patterson

*Primary Examiner*—Mickey Yu
*Assistant Examiner*—Jerrold Johnson
(74) *Attorney, Agent, or Firm*—Arent Fox LLP.

(57) ABSTRACT

A multi-layered child resistant blister package having blister packaging that retains an article. A single blank sheet has first and second opposing side edges and first, second, and third score lines that are parallel to the first and second opposing side edges. The opposing side edges and score lines delimit a back panel, first and second intermediate panels, and a top panel having at least one blister receiving pocket. The first intermediate panel is folded onto the back panel about the first score line. The second intermediate panel is folded onto the first intermediate panel about the second score line. The top panel is folded onto the second intermediate panel about the third score line. A cavity through which the article passes is defined at least by the first and second intermediate panels. The back panel includes a tear away panel positioned remote from an outer periphery of the package.

23 Claims, 7 Drawing Sheets

MULTI-LAYERED CHILD RESISTANT BLISTER PACKAGE AND METHOD OF ASSEMBLING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a multi-layered blister package having a cavity with a depth that makes removal of articles contained within the package difficult for children.

2. Discussion of Related Art

It is common practice to use blister packages to package small solid articles or products which may be dispensed from the package by applying pressure to the blister to force the article or product from an individual blister or capsule through a rupturable membrane. Since this type of packaging is typically used for marketing medicines, the invention will be referred to herein with respect to a package particularly suitable for such use, but it should be understood that the package may be used for other products as well. Recently, a substantial effort has been directed toward providing packaging that contains sufficient impediments to prevent children from easily opening the package and gaining access to the package articles or products while still providing adults with easy access to the articles or products contained therein.

For example, U.S. Pat. No. 6,161,699 to Gartland discloses a conventional child-resistant package 10 having a blister containing laminate 12 with a plurality of cavity forming blisters 14 provided therein and projecting from a top of the laminate 12. As illustrated in FIGS. 1–4 of Gartland, each blister 14 includes a tablet or pill 16. A foil sheet 18 seals the blister 14 with the pill 16 therein. A card backing 20 is then laminated onto the other surface of the foil 18 and is formed with a series of punch-out sections 22 that are aligned with the blisters 14. Each punch out section 22 has perforations 24. A high strength adhesive film 26 is laminated onto the back of the card 20. The adhesive film 26 is then removed to expose the punch-outs 22 formed by the perforations 24 in the card backing 20. Then, in order to remove the pill 16 from the blister 14, pressure is applied to the blister 14 so the pill punctures the foil 18.

Gartland's package requires a rather undesirable level of dexterity on the part of a user attempting to gain access to the pill 16 in that the user must somehow peel the adhesive film 26 off the back of the card 20 before applying pressure to the blister 14. Presumably, the user will have to slide a fingernail or other thin device, such as a knife, between the film 26 and card 20 so as to peel the film 26 off the card 20. Adults, particularly the elderly, may not have the dexterity, hand eye coordination, or patience necessary to peel the film 26 off the back of the card 20, especially those that suffer from arthritis, poor vision, and other such ailments.

U.S. Pat. No. 5,758,774 to LeBlong discloses another example of a conventional child resistant blister package. In particular, LeBlong discloses a convertible child-resistant blister package 10 that includes a first thermo-formable layer 11 bonded onto a second layer 12 formed from a rupturable material, such as, for example, foil. A blister 15 containing a tablet or pill 16 is provided in the first layer 11. A third layer 17 is adhered to a bottom of the second layer 12 with a fourth layer 20 adhered to the back of the third layer 17. A release peel coating is provided between the third layer 17 and the second layer 12 so that the third layer 17 can be peeled off the second layer 12.

Furthermore, the third and fourth layers 17 and 20 are integral so that when the third layer 17 is peeled off the second layer 12, both the third and fourth layers 17 and 20 are removed together. Tear slits 21 extend through all four layers to provide access to the individual blisters 15. Therefore, in order to gain access to the tablet or pill 16, a detachable section 22 provided at the end of the package 10 is removed exposing the end 26 of a perforated strip 27 provided in the third and fourth layers 17 and 20. See FIG. 2 of LeBlong. Then, the longitudinally extending perforated strip 27 is removed exposing the rupturable second layer 12 through which the row of tablets 16 can be pushed. See FIG. 4 of LeBlong.

It is well known in the industry that child resistant features in such packaging is most effective when provided toward a center of the package away from the edge of the package as such placement restricts children from biting through the edge of the package to gain access to the article or product provided therein. In other words, when removable portions of the child resistant feature are provided along the outer edge of the package, it has been found that children are able to access the articles or products simply by biting through the outer edge of the package. Leblong's package enables children to access any unused pills 16 provided beneath the perforated strip 27 as the end 26 of the strip becomes the edge of the package 10 after the detachable portion 22 is removed.

U.S. Pat. No. 5,339,960 to Price discloses yet another example of a conventional child resistant blister package. It should be noted that the Price package positions the child resistant feature at the outer edge of the package. Specifically, Price discloses a child resistant package 10 having a body 11 that contains a plurality of blister chambers 12 with a pill 13 provided therein. The package 10 includes panels A, B, and C. Panel C is folded over panel B and then panel A is folded over panel C. See FIG. 3 of Price. Panel B includes oval cutouts 36 through which the blister 12 extends. Panel C includes score lines 48 and 50 that align with the oval cutouts 36 in panel B. Likewise, panel A includes score lines 18 that align with the score lines 48 of panel C and oval cutouts 36 of panel B. Panel A also includes a tab 15 with a peel away access panel 17 formed by the score lines 18 and 45.

To gain access to the pill 13, the tab 15 and peel away access panel 17 on the outer edge of the package are removed to expose a bendable breakaway panel 21. The bendable breakaway panel 21 is then removed exposing a rupturable foil barrier 19. Then, pressure is applied to the blister chamber 12 such that the pill 13 can penetrate through the foil barrier 19. See FIG. 2 of Price.

SUMMARY OF THE INVENTION

An object of this invention is to at least overcome the above-discussed drawbacks of the conventional child resistant packages and dispensers.

Another object of this invention is to provide a multi-layered child resistant blister package having blister packaging with at least one blister that retains an article therein. A single blank sheet has parallel first and second opposing side edges and first, second, and third score lines that are substantially parallel to the first and second opposing side edges. The opposing side edges and score lines delimit a back panel, first and second intermediate panels, and a top panel having at least one blister receiving pocket, respectively.

To assemble the package, the first intermediate panel is folded onto the back panel about the first score line. Then, the second intermediate panel is folded onto the first intermediate panel about the second score line. The top panel is then folded onto the second intermediate panel about the third score line. The blister packaging is attached to the top panel so that the blister receiving pocket receives the blister of the blister packaging. A cavity through which the article passes is defined at least by the folded first and second intermediate panels. The back panel includes at least one tear away panel positioned remote from an outer periphery of the package. The tear away panels are aligned with a corresponding blister.

BRIEF DESCRIPTION OF THE DRAWINGS

Other objects and features of this invention will be better understood from the following description, with reference to the accompanying drawings, wherein.

DETAILED DESCRIPTION OF THE PREFERRED EMBODIMENTS

Figure 1:
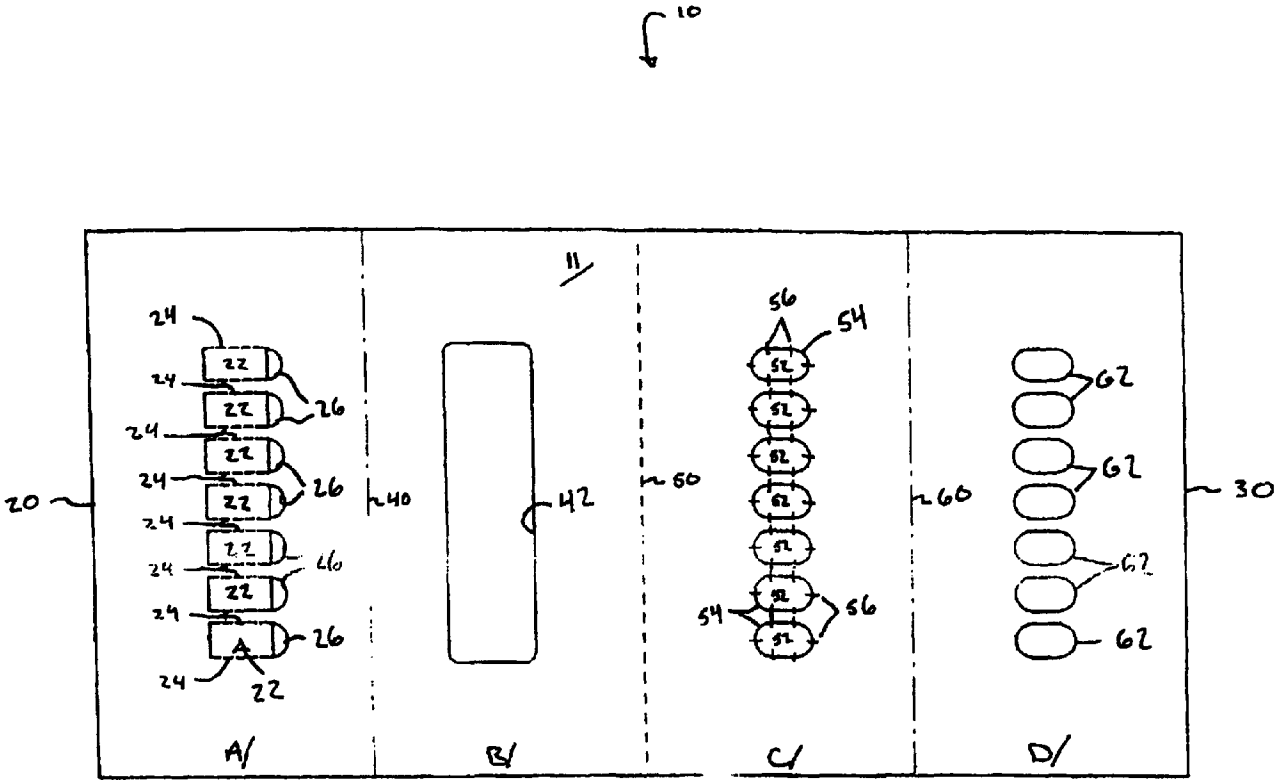
FIG. 1 is a top view of the disassembled package, according to a preferred embodiment of this invention.

Referring to FIG. 1, the package 10 is formed from a flat, substantially rectangular shaped single blank 11, ideally made from paperboard. However, it is within the scope of this invention to use any suitable material well known or later developed in the art, such as, for example, paper, plastic, and the like.

Parallel to opposing edges 20 and 30, there are defined non-conventional and mutually parallel score lines 40, 50, and 60, which delimit generally identically sized, substantially rectangular, panels A, B, C, and D. Score line 40 enables panel B to be folded about score line 40 onto panel A. Similarly, score line 60 enables panel D to be folded about score line 60 onto panel C. Finally, score line 50 enable panels C and D, with panel D already folded onto panel C, to be folded about score line 50 onto panels A and B, with panel B already folded onto panel A.

It should be noted that the scope of this invention is not limited to the order of the above-described sequence of steps for folding the respective panels onto each other. For example, panel B can be folded onto panel A about score line 40. Then, panel C can be folded onto panel B about score line 50. Finally, panel D can be folded onto panel C about score line 60. As stated above, the scope of this invention is not limited to the sequence of the above-described example of folding steps. In fact, every permutation of possible folding sequences regarding panels A, B, C, and D about score lines 40, 50, and 60 is considered to be within the scope of this invention.

Panel A includes a plurality of individual tear away panels 22 that are each defined by non-continuous score lines 24. FIG. 1 illustrates a total of seven tear away panels 22 that are substantially rectangular in shape and disposed approximately in the center of panel A. It should be noted the number of tear away panels 22 illustrated is strictly exemplary in nature and is in no way intended to limit the number of tear away panels 22 that can be included in the package 10. Furthermore, each tear away panel 22 stands alone and is not connected with another tear away panel.

Furthermore, the shape of each tear away panel 22 being rectangular is merely exemplary and it is within the scope of this invention to use any known shape to define the panels 22, such as, but not limited to, circular, oval, square, triangular, trapezoidal, and the like. Although in the exemplary preferred embodiment the tear way panels 22 are shown as being positioned relatively in the center of panel A, it is within the scope of this invention to place the tear away panels 22 anywhere on the panel A that is remote from the outer periphery of the assembled package 10 such that the articles P contained in the package cannot be accessed simply by biting through the outer edge of the package. Each tear away panel 22 is abuttingly adjacent a corresponding access aperture 26.

Although the access apertures 26 are illustrated as being semi-circular in shape, it is within the scope of this invention to provide each access aperture 26 to be of any known shape, such as, for example, rectangular, square, triangular, trapezoidal, and the like. The shape of the access aperture 26 should be chosen so as to define an opening that is easily accessible by, such as, for example only, a finger of a user, a fingernail of a user, a pencil, a pen, a tip of a key, and the like, so that the tear away panel 22 can be removed from the panel A along score lines 24. Panel A forms the back surface of the assembled package 10 when the panels A, B, C, and D are folded onto each other.

Figure 2:
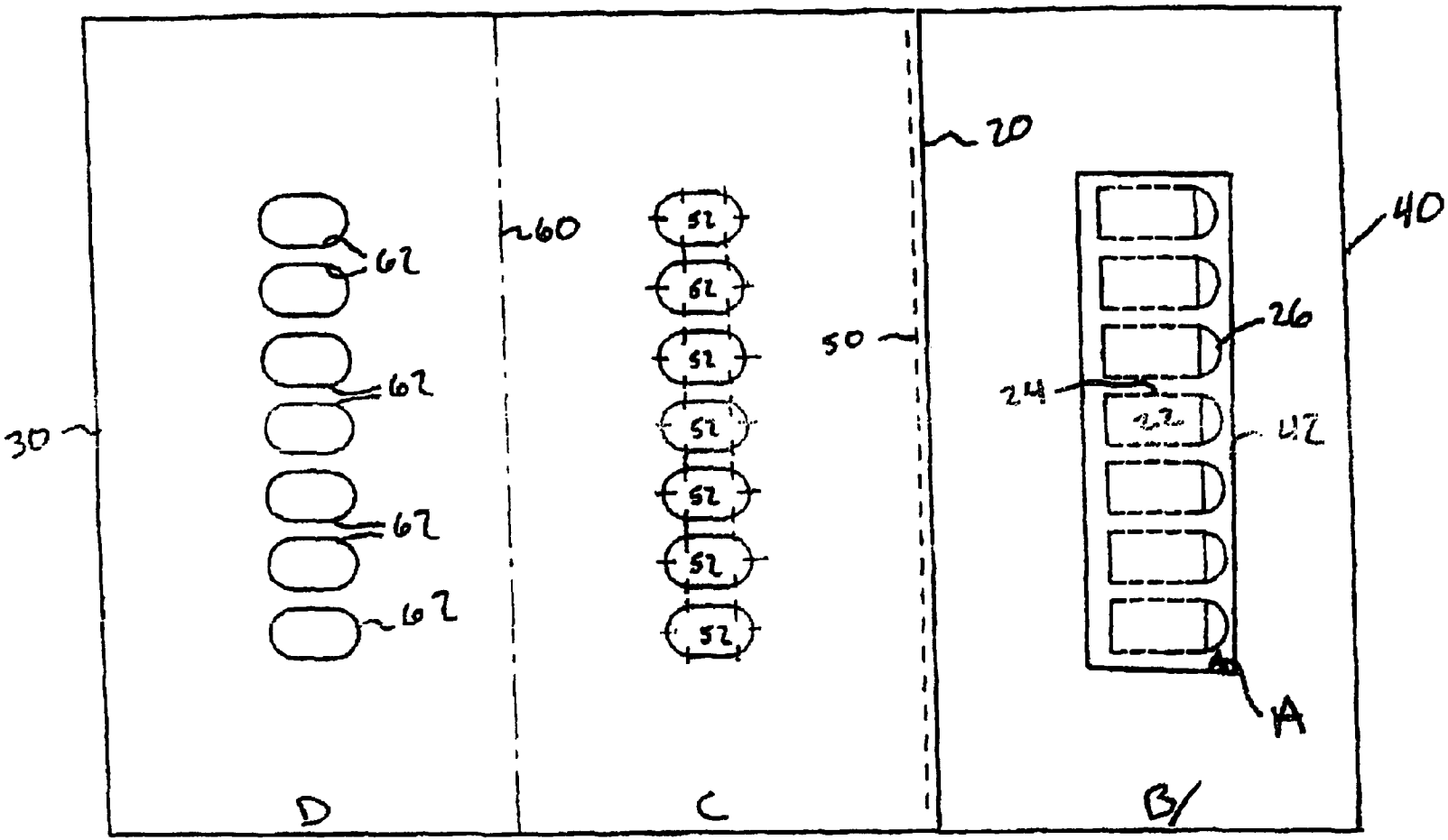
FIG. 2 is a partial, top view of the package of FIG. 1 with panel B folded onto panel C.

Panel B includes an aperture 42 positioned therein so as to encompass all of the tear away panels 22 when panel B is folded onto panel A about score line 40, as shown in FIG. 2. Although the aperture 42 is illustrated as being substantially rectangular, it should be noted that it is within the scope of the invention to have the aperture 42 be any known shape, such as, for example, but not limited to, circular, trapezoidal, oval, triangular, and the like, so long as the tear away panels 22 and access apertures 26 are encompassed by the apertures 42 when the panel B is folded onto panel A about score line 40. Furthermore, panel B is an intermediate layer when the package 10 is assembled and provides the package 10 with an additional layer that adds depth to a cavity 200 formed in the fully assembled package 10 (FIG. 4), which restricts children from picking at the contents of the package as the package is thicker and more difficult to bite through.

Figure 3:
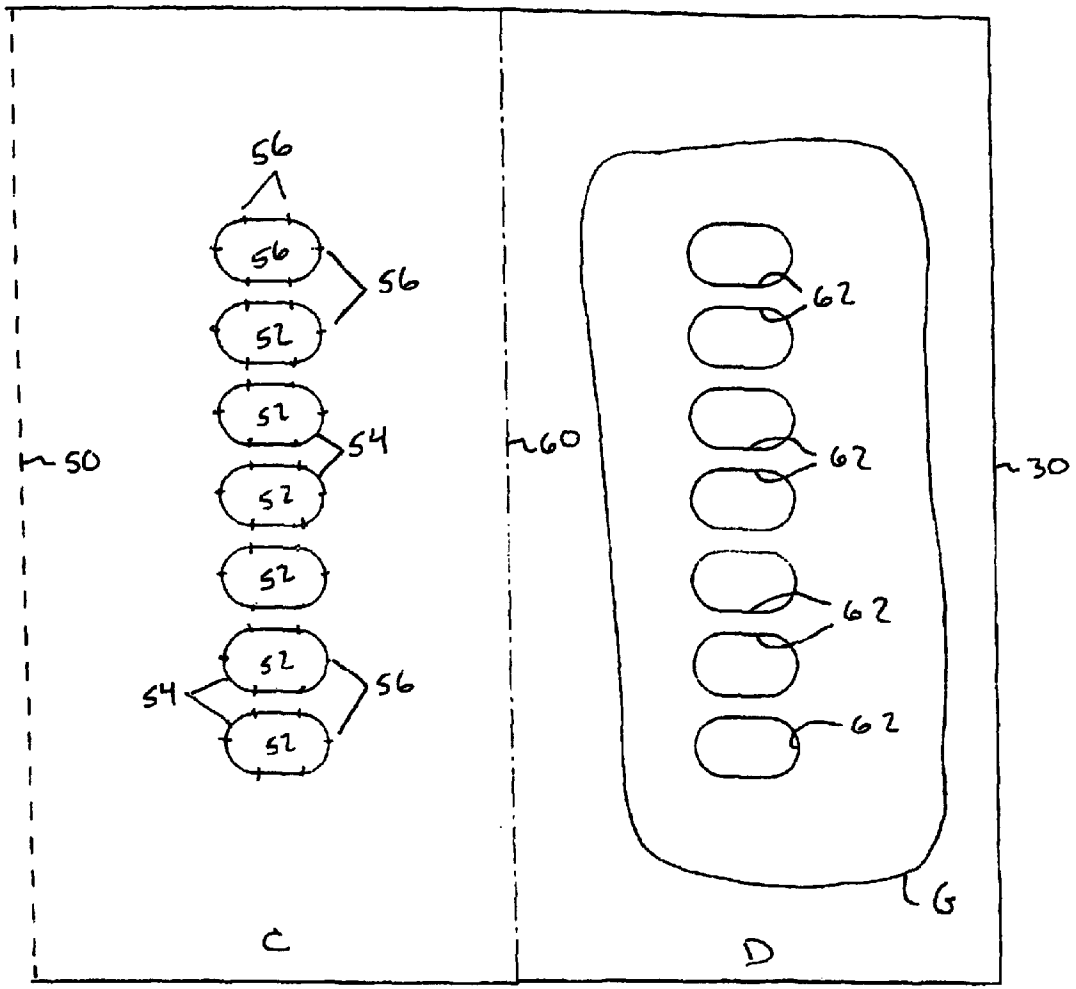
FIG. 3 is a partial, top view of the package of FIG. 1 with panel C folded onto panels A and B.
Figure 4:
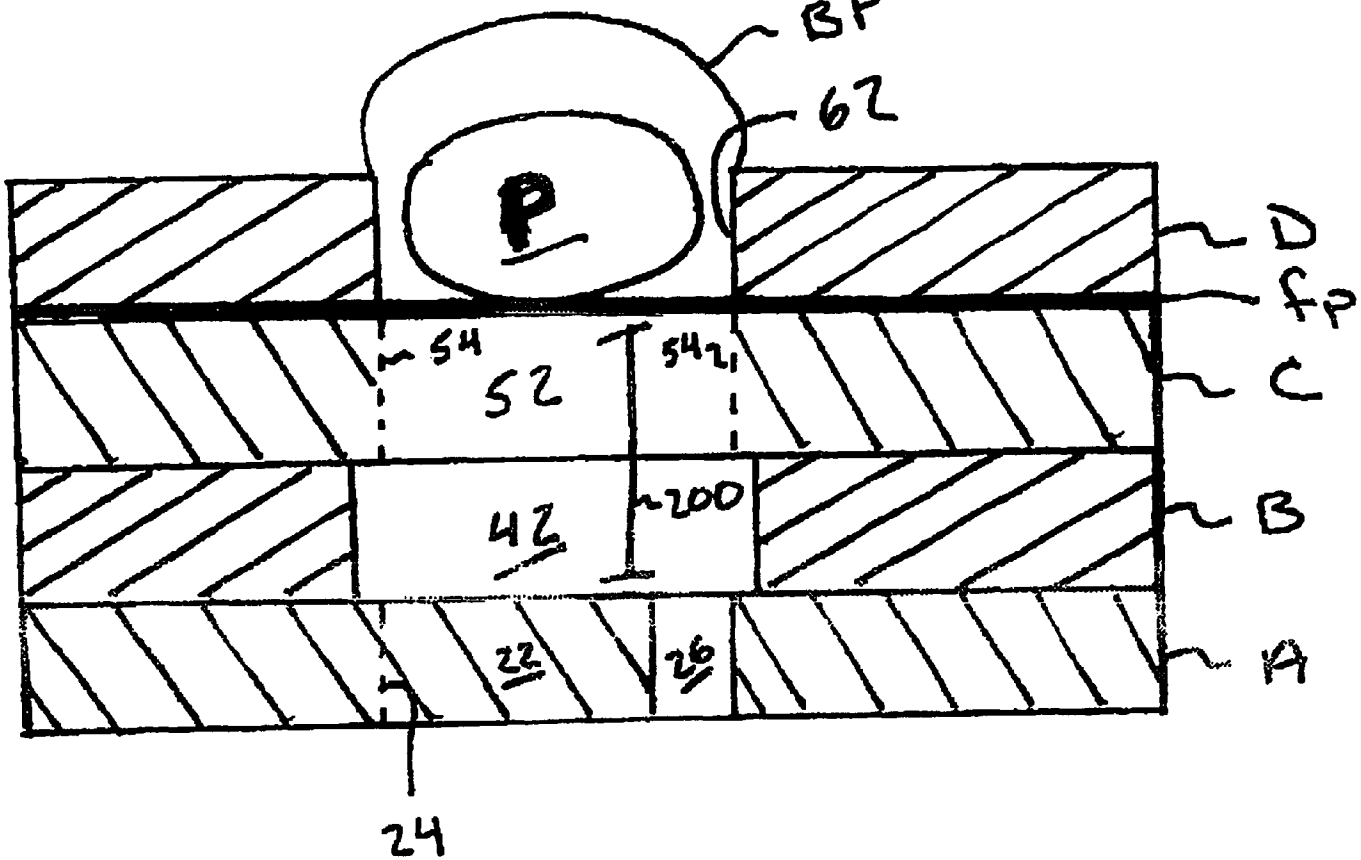
FIG. 4 is a schematic diagram illustrating a partial sectional view of the assembled package of FIG. 1 with an article being retained by blister packaging.

Returning to FIG. 1, it can be seen that panel C includes a plurality of punch outs 52 that correspond to the number of tear away panels 22. Each punch out 52 is aligned with a corresponding tear away panel 22 and is defined by a non-continuous score line 54 that is interrupted by securing nicks 56 that hold the punch out 52 in place. Although the punch outs 52 are illustrated as being oval, it should be noted that it is within the scope of this invention to provide punch outs 52 of any known shape, such as, for example, but not limited to, rectangular, circular, triangular, trapezoidal, square, and the like, so that they may facilitate an article P passing therethrough when forced from the blister as will be explained in further detail below. It should be noted that the panel C is another intermediate layer of the package 10 when fully assembled that also adds depth to the cavity 200 formed in the fully assembled package 10 (FIG. 4). Because panel C does not have any openings therein until an article P is passed through one of the punch outs 52, panels A and B are obscured from view when panel C is folded onto panels A and B about score line 50, as shown in FIG. 3.

Moreover, as shown in FIG. 1, panel D includes a plurality of blister receiving pockets 62 that correspond to the number of tear away panels 22 in panel A and punch outs 52 in panel C. The pockets 62 typically will contain blister packaging BP (FIG. 4) that is well known in the art and is made from such materials as, for example only, a clear plastic, foil, or the like. It should be noted that blister packaging BP is well known in the art and includes a backing that includes a foil portion fp through which each article P must pass when being removed from the package 10. As shown in FIG. 3, the blister packaging BP is adhered onto a back surface of the panel D within an adhering region G. To affix the blister packaging BP to the panel D, an adhesive material, such as, but not limited to, glue, is placed on the adhering region G. Then, a top surface of the blister packaging BP, which is not visible when the package 10 is fully assembled, is attached to the panel D in the adhering region G so that the blisters are received and held by corresponding pockets 62 in the panel D. It should be noted that it is also within the scope of this invention to position the blister packaging BP without the use of an adhesive material in a manner that is well known in the art.

Figure 5:
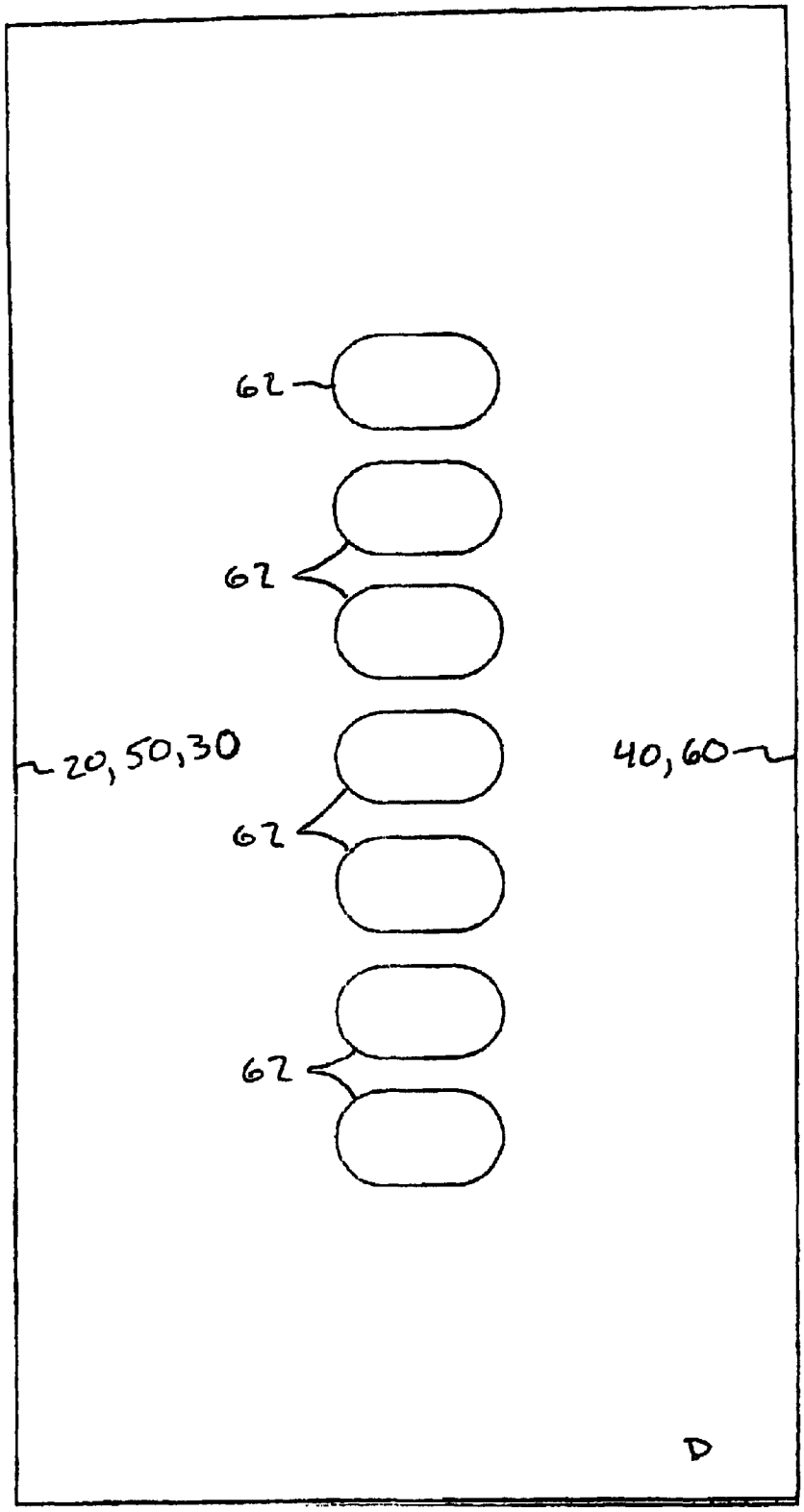
FIG. 5 is a top view of the assembled package of FIG. 1 with panel D folded onto panels A, B, and C.

Each pocket 62 is aligned with a corresponding tear away panel 22 and punch out 52 when the package 10 is assembled, as shown in FIG. 4. Although the pockets 62 are illustrated as being oval, it should be noted that it is within the scope of this invention to provide pockets 62 of any known shape, such as, for example, but not limited to, rectangular, circular, triangular, trapezoidal, square, and the like, so that they may facilitate the article P passing therethrough When forced from the blister packaging BP, as will be explained in further detail below. It should be noted that the panel D is the top layer of the fully assembled multilayered package 10, as shown in FIG. 5.

To assemble the package 10, a bonding agent (not shown) is placed on a top surface of panel A. Panel B is then folded onto panel A about score line 40 so that the aperture 42 fully encompasses each and every tear away panel 22 and access aperture 26 provided on panel A. The bonding agent (not shown) is placed on a bottom surface of either one of panel B or C. Panel C is then folded onto panel B about score line 50 so that the bottom surfaces of panels B and C are bonded together and the punch outs 52 in panel C are aligned with the tear away panels 22 in panel A. The blister packaging BP is then affixed to panel D as described above. A bonding agent (not shown) is placed on a top surface of either one of panel C or panel D and panel D is then folded onto panel C about score line 60, to fully assemble the package 10.

To remove the article P held b the blister packaging BP in a blister pocket 62 of panel D, a user first turns the package 10 over so the tear away panels 22 are visible. Then, by placing a fingertip or fingernail or other such object into the access panel 26 corresponding to the desired article P, the user lifts up and removes the tear away panel 22 by breaking the non-continuous score lines 24 to expose a corresponding punch out 52 on panel C. The user then pushes downward on the blister packaging BP, forcing the article P contained in the pocket 62 from the blister pocket, through the foil portion fp and punch out 52 in panel C. The article P then passes through the opening formed by the removed tear away panel 22 into the hands of the user.

As such, the above-described invention provides a child resistant multilayered package that restricts articles contained within the package from being removed by children while simultaneously providing a package that is simple to manufacture, easy to use by adults, and cost efficient.

An alternate embodiment of the package 110 according to the invention is discussed below with regards to FIGS. 6–7.

The package 110 is substantially similar to the package 10 of the exemplary preferred embodiment described above with regards to FIGS. 1–5. In particular, the package 110 includes panels A, B, C, and D, which are nearly identical to those of package 10. As such, a detailed discussion of panels A, B, C, and D will be omitted to avoid redundancy. However, it should be noted that panel A is not delimited by edge 20 that opposes edge 30 of panel D. Rather, as shown in FIG. 6, panel A is delimited by hinge 90 and score line 40.

Figure 6:
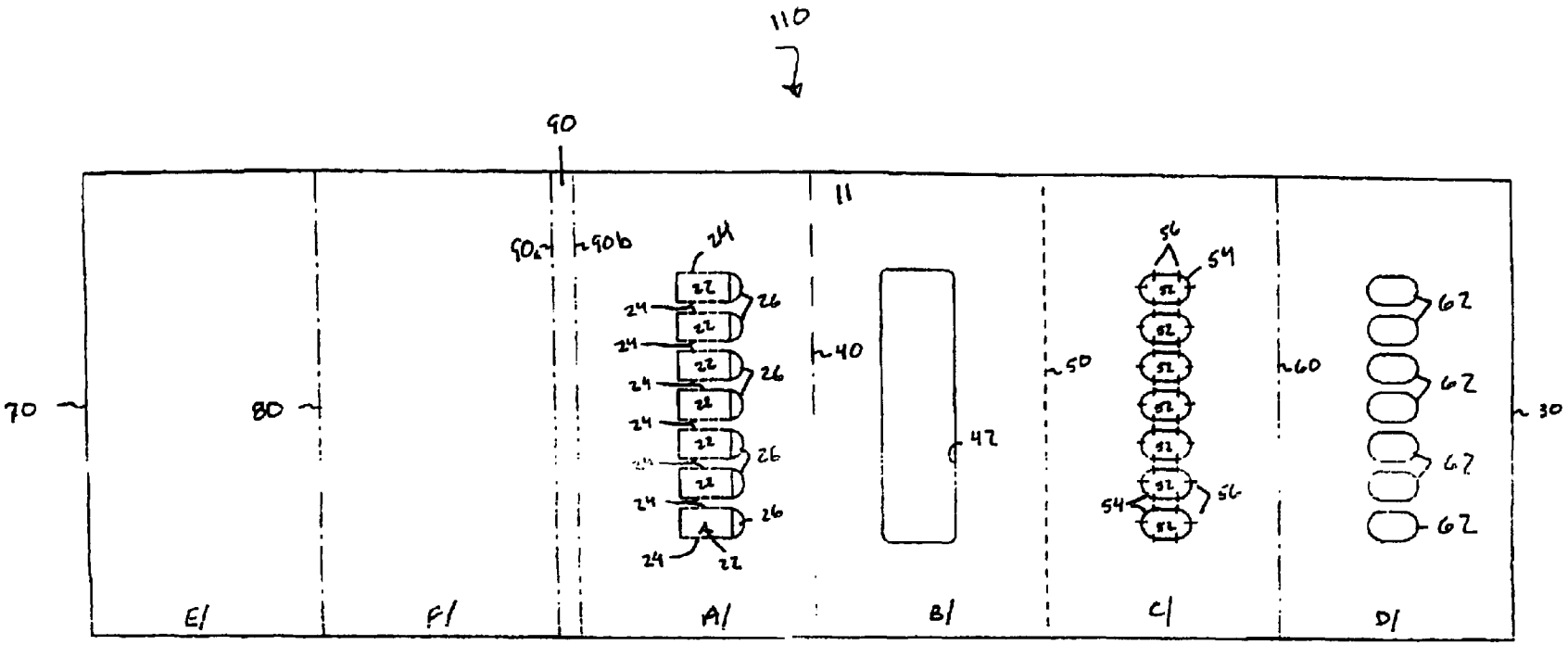
FIG. 6 is a top view of the disassembled package, according to an alternate embodiment of this invention.
Figure 7:
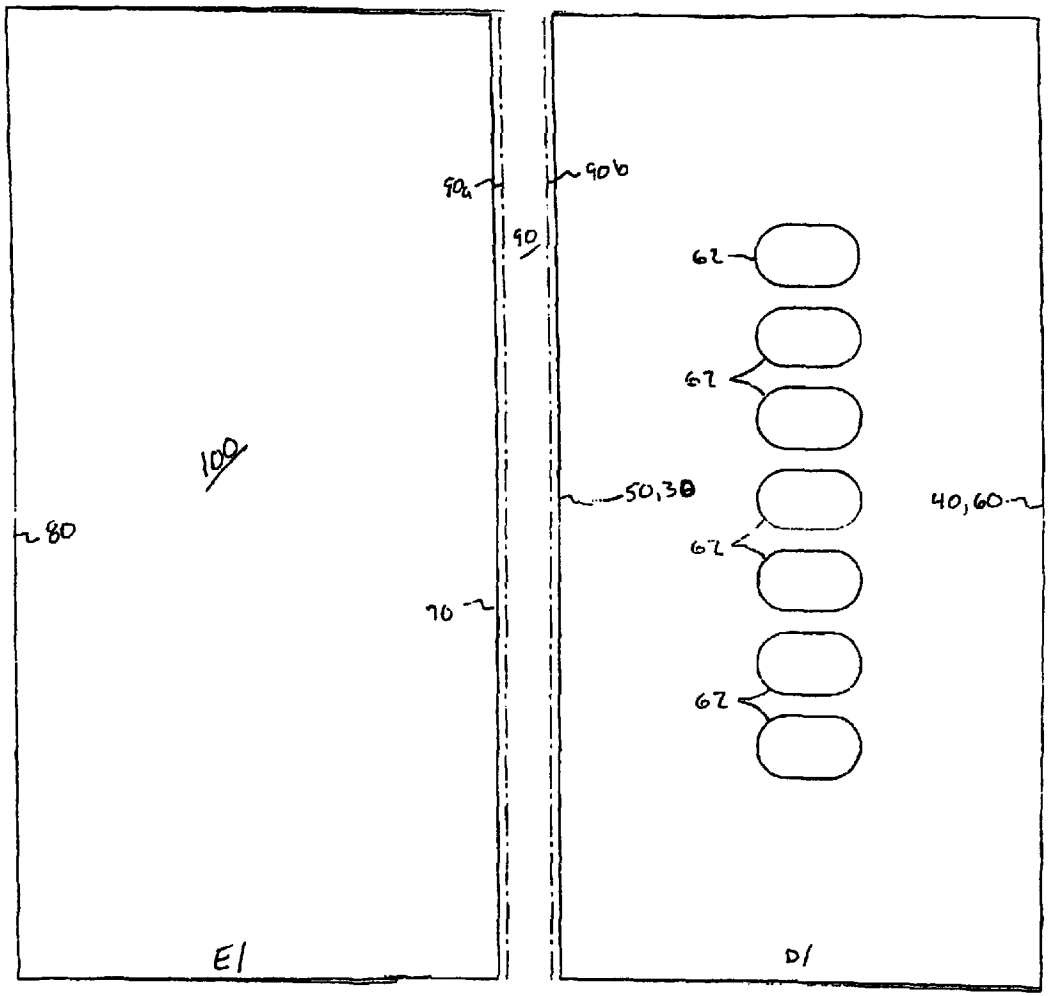
FIG. 7 is a top view of the package shown in FIG. 6 with panel E folded onto panel F and panel D folded onto panels A, B and C.

As shown in FIG. 6, the package 110 includes panels E and F that are adjacent to panel A and on an opposite side of hinge 90, which is located between panel F and panel A. Furthermore, edge 70 of panel E is parallel to and opposite edge 30 of panel D.

Panel E is delimited by edge 70 and score line 80, which is parallel to the edge 70. Panel F is delimited by score line 80 and hinge 90. Panel E is foldable onto panel F about score line 80 to form a cover 100 for the package 110. The hinge 90 is formed by scoring the blank 11 at hinge folds 90a and 90b. As such, the package 110 can take the form of a book when panels A, B, C, and D are folded over each other as explained above in the preferred embodiment. Then, panel E is folded over panel F about score line 80 to form the cover 100. The cover 100 is then folded over the panels A, B, C, and D, which form the other half of the book shaped multilayered package 110, about the hinge 90.

The article P is removed from the package 110 similar to the exemplary preferred embodiment, with the additional step of opening the package 110 by turning the cover 100 away from the panels A, B, C, and D. It should be noted that the cover 100 may include indicia, such as, for example only, the name of article P manufacturer, the dosage of the article P, when the article P should be taken by the user, and other such information.

As such, the above-described invention provides a child resistant package using panels that fold onto each other about non-continuous score lines provided between neighboring panels. The folded panels provide a package with a cavity having a depth that discourages children from biting through the package and generally obstruct articles contained within the package from being removed by children. Simultaneously, the packaging is simple to manufacture, easy to use by adults, and is cost efficient.

Additionally, many modifications may be made to adapt the teachings of the child resistant package of this invention to particular situations or materials without departing from the scope thereof. Therefore, this invention should not be limited to the particular embodiments disclosed herein, but includes all embodiments within the spirit and scope of the disclosure.

We claim:

1. A multi-layered child resistant package, comprising:

blister packaging having at least one blister that retains an article therein;

a single blank sheet having parallel first and second opposing side edges and first, second, and third score lines substantially parallel to said first and second opposing side edges that delimit a back panel, first and second intermediate panels, and a top panel having at least one blister receiving pocket, respectively, wherein said first intermediate panel is folded onto said back panel about said first score line, said second intermediate panel is folded onto said first intermediate panel about said second score line, and said top panel is folded onto said second intermediate panel about said third score line, wherein said blister packaging is attached to said top panel and said at least one blister receiving pocket receives said at least one blister of said blister packaging, *and* a cavity through which said article passes, said cavity is aligned with a corresponding said at least one blister and is defined in at least in said first and second intermediate panels[; and at least one tear away panel located on said back panel remote from an outer periphery of said package, said at least one tear away panel being aligned with a corresponding said at least one blister].

2. The child resistant package according to claim [1] *21*, wherein said [a] *at* least one tear away panel is defined by a non-continuous score line.

3. The child resistant package according to claim 2, wherein each said at least one tear away panel further comprises an access aperture abuttingly adjacent a side of said at least one tear away panel not having said non-continuous score line.

4. The child resistant package according to claim [1] *21*, wherein said first intermediate panel includes an aperture that encompasses said at least one tear away panel and access aperture when said first intermediate panel is folded onto said back panel about said first score line.

5. The child resistant package according to claim [1] *21*, wherein said second intermediate panel includes at least one punch out aligned with a corresponding said at least one tear away panel and said at least one blister, said at least one punch out defined by a non-continuous score line interrupted by a plurality of securing nicks.

6. The child resistant package according to claim 1, wherein said first side edge is a hinge formed by parallel first and second opposing hinge folds.

7. The child resistant package according to claim 6, further comprising fifth and sixth panels separated by a fourth score line, wherein said sixth panel is adjacent said hinge.

8. The child resistant package according to claim 7, wherein said fifth panel is folded onto said sixth panel about said fourth score line to form a cover for said package.

9. A multi-layered child resistant package, comprising:

blister packaging having at least one blister that retains an article therein;

a single blank sheet having parallel first and second opposing side edges and first, second, and third score lines substantially parallel to said first and second opposing side edges that delimit a back panel, first and second intermediate panels, and a top panel having at least one blister receiving pocket, respectively, wherein said first side edge is a hinge formed by parallel first and second opposing hinge folds, wherein said first intermediate panel is folded onto said back panel about said first score line, said second intermediate panel is folded onto said first intermediate panel about said second score line, and said top panel is folded onto said second intermediate panel about said third score line, wherein said blister packaging is attached to said top panel and said at least one blister receiving pocket receives said at least one blister of said blister packaging, *and* a cavity through which said article passes, said cavity is aligned with a corresponding said at least one blister and is defined in at least said first and second intermediate panels[; and at least one tear away panel located on said back panel remote from an outer periphery of said package, said at least one tear away panel being aligned with a corresponding said at least one blister].

10. The child resistant package according to claim [9] *22*, wherein said [a] *at* least one tear away panel is defined by a non-continuous score line.

11. The child resistant package according to claim 10, wherein each said at least one tear away panel further comprises an access aperture abuttingly adjacent a side of said at least one tear away panel not having said non-continuous score line.

12. The child resistant package according to claim [9] *22*, wherein said first intermediate panel includes an aperture that encompasses said at least one tear away panel and access aperture when said first intermediate panel is folded onto said back panel about said first score line.

13. The child resistant package according to claim [9] *22*, wherein said second intermediate panel includes at least one punch out aligned with a corresponding said at least one tear away panel and said at least one blister, said at least one punch out defined by a non-continuous score line interrupted by a plurality of securing nicks.

14. The child resistant package according to claim 9, further comprising fifth and sixth panels separated by a fourth score line, wherein said sixth panel is adjacent said hinge.

15. The child resistant package according to claim 14, wherein said fifth panel is folded onto said sixth panel about said fourth score line to form a cover for said package.

16. A method of assembling a multi-layered child resistant package having blister packaging with at least one blister that retains an article therein, a single blank sheet including parallel first and second opposing side edges and first, second, and third score lines substantially parallel to the first and second opposing side edges that delimit a back panel, first and second intermediate panels, and a top panel having at least one blister receiving pocket, respectively, said method comprising the steps of:

folding the first intermediate panel onto the back panel about the first score line;

folding the second intermediate panel onto the first intermediate panel about the second score line, wherein at least the folded first and second intermediate panels form a cavity through which the article passes;

affixing the blister packaging to the top panel; *and* folding the top panel onto the second intermediate panel about the third score line[;

positioning at least one tear away panel on the back panel remote from an outer periphery of the package; and aligning the at least one tear away panel with a corresponding blister].

17. The method according to claim 16, wherein the first opposing side edge is a hinge formed by parallel first and second opposing hinge folds and the package further includes fifth and sixth panels separated by a fourth score line, the sixth panel being adjacent the hinge, said method comprising the additional step of:

folding the fifth panel onto the sixth panel about the fourth score line to form a cover for the assembled package.

18. The method according to claim [16] *23*, further comprising the step of forming an aperture on the first intermediate panel before the step of folding the first intermediate panel, wherein the aperture on the first intermediate panel encompasses the at least one tear away panel on the back panel when the first intermediate panel is folded onto the back panel.

19. The method according to claim [16] *23*, further comprising the step of forming at least one punch out on the second intermediate panel before the second intermediate panel is folded onto the first intermediate panel, wherein the at least one punch out is aligned with the at least one tear away panel.

20. The method according to claim 16, further comprising the step of forming at least one blister receiving pocket on the top panel to receive the blister therein before the step of folding the first intermediate panel onto the back panel.

*21. The child resistant packaging according to claim 1, further comprising at least one tear away panel located on said back panel remote from an outer periphery of said package, said at least one tear away panel being aligned with a corresponding said at least one blister.*

*22. The child resistant package according to claim 9, further comprising at least one tear away panel located on said back panel remote from an outer periphery of said package, said at least one tear away panel being aligned with a corresponding said at least one blister.*

*23. The method according to claim 16, further comprising the steps of positioning at least one tear away panel on the back panel remote from an outer periphery of the package; and aligning the at least one tear away panel with a corresponding blister.*

* * * * *